(12) United States Patent
Oshima et al.

(10) Patent No.: US 8,564,852 B2
(45) Date of Patent: Oct. 22, 2013

(54) COMPLEX APPARATUS

(75) Inventors: Kenji Oshima, Kamiina-gun (JP); Koji Hara, Shiojiri (JP); Yuji Miyamoto, Shiojiri (JP); Masayuki Horikawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 126 days.

(21) Appl. No.: 13/296,083

(22) Filed: Nov. 14, 2011

(65) Prior Publication Data

US 2012/0120461 A1    May 17, 2012

(30) Foreign Application Priority Data

Nov. 15, 2010    (JP) .................................. 2010-254591

(51) Int. Cl.
*H04N 1/04*    (2006.01)
(52) U.S. Cl.
USPC ............ 358/474; 358/475; 358/496; 271/226
(58) Field of Classification Search
USPC ........... 358/474, 486, 497, 496, 475; 271/226
See application file for complete search history.

(56) References Cited

U.S. PATENT DOCUMENTS

| 6,804,858 | B2 * | 10/2004 | Yazawa et al. | 16/289 |
|---|---|---|---|---|
| 7,631,965 | B2 * | 12/2009 | Samoto et al. | 347/108 |
| 7,722,033 | B2 * | 5/2010 | Matsumoto et al. | 271/162 |
| 7,733,540 | B2 * | 6/2010 | Moribe | 358/474 |
| 7,751,094 | B2 * | 7/2010 | Ouchi | 358/474 |
| 7,778,572 | B2 * | 8/2010 | Iijima | 399/125 |
| 7,784,891 | B2 * | 8/2010 | Kumagai | 347/8 |
| 7,806,524 | B2 * | 10/2010 | Watanabe et al. | 347/104 |
| 7,809,308 | B2 * | 10/2010 | Sekiya | 399/124 |
| 7,862,030 | B2 * | 1/2011 | Igarashi | 271/10.1 |
| 8,081,899 | B2 * | 12/2011 | Ito | 399/110 |
| 8,107,852 | B2 * | 1/2012 | Ito | 399/110 |
| 8,340,567 | B2 * | 12/2012 | Katayama | 399/405 |
| 8,345,318 | B2 * | 1/2013 | Osakabe et al. | 358/296 |

FOREIGN PATENT DOCUMENTS

| JP | 2000-131908 | A | 5/2000 |
|---|---|---|---|
| JP | 2002-144673 | | 5/2002 |
| JP | 2002-144673 | A | 5/2002 |
| JP | 2007-049272 | A | 2/2007 |

* cited by examiner

*Primary Examiner* — Negussie Worku
(74) *Attorney, Agent, or Firm* — Workman Nydegger

(57) ABSTRACT

A complex apparatus includes a recording device including a recording unit that executes recording on a medium; an image reading device, provided so as to be freely openable/closable with respect to the upper portion of the recording device via a hinge portion, including an image reading unit that reads an image; a first contact portion, provided in the image reading device, that makes contact with a housing of the recording device when the image reading device is in a closed state; a second contact portion, provided in the housing of the recording device, that makes contact with the first contact portion when the image reading device is in a closed state; and a third contact portion, provided in an apparatus frame that holds the recording unit, that makes contact with the housing of the recording device at the lower area of the second contact portion.

12 Claims, 13 Drawing Sheets

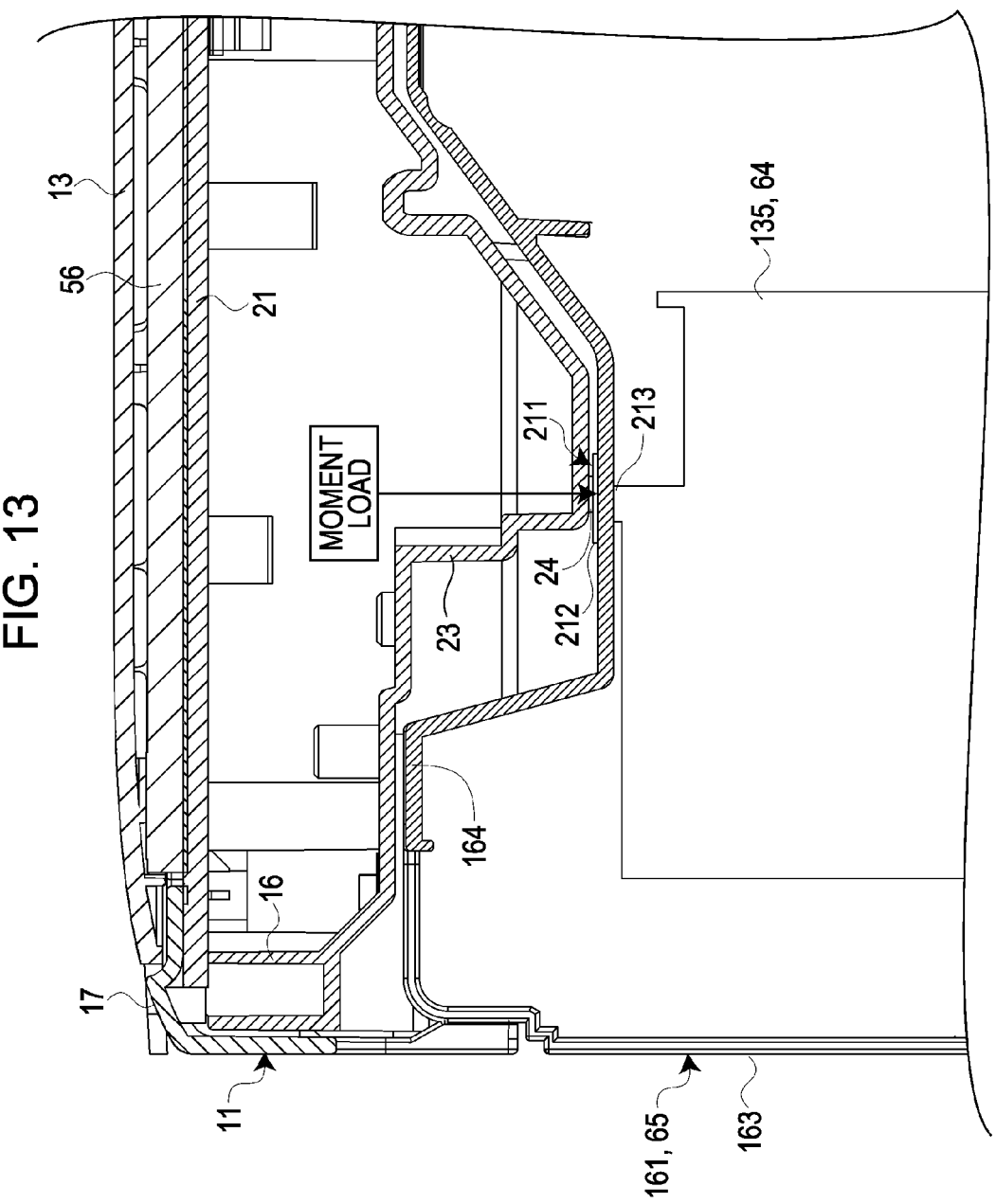

COMPLEX APPARATUS

BACKGROUND

1. Technical Field

The present invention relates to complex apparatuses that include a first device and a second device that covers the top of the first device in a freely openable/closable state.

2. Related Art

Thus far, apparatuses that include a printer and a scanner that covers the top of the printer in a freely openable/closable state have been known as examples of complex apparatuses (see JP-A-2002-144673). The printer is configured by containing a printer engine within an apparatus housing that has an opening in its upper surface, whereas the scanner is configured by containing a scanner engine within an upper housing. The scanner covers the printer by covering the opening in the upper surface of the apparatus housing in a freely openable/closable state via a hinge portion, and when the scanner has been opened, the replacement of ink cartridges and so on can be carried out through the opening in the upper surface.

Meanwhile, when the scanner is closed, the apparatus housing directly supports the scanner through a pair of cylinders provided in an upper plate that forms the opening in the upper surface. Each cylinder includes a push-pin contained within a groove portion in the upper plate and a spring that biases the push-pin in a projecting direction, and the tips of the pair of push-pins support the front area of the scanner.

As described above, with such a past complex apparatus, the load of the moment of the scanner central to the hinge portion is received (supported) by the upper plate of the apparatus housing via the pair of cylinders (e.g., via the push-pins). Accordingly, there is a risk that the upper plate will bend and interfere with the printer engine and other internal units as a result. Although providing a space or interval sufficient to permit the bending between the upper plate and the internal units can be considered, such a measure is problematic in that such a space leads to an increase in the size of the overall apparatus.

SUMMARY

It is an advantage of some aspects of the invention to provide a complex apparatus capable of supporting a second device in a favorable manner without increasing the size of the overall apparatus.

A complex apparatus according to an aspect of the invention includes: a recording device including a recording unit that executes recording on a medium; an image reading device, provided so as to be freely openable/closable with respect to the upper portion of the recording device via a hinge portion, including an image reading unit that reads an image; a first contact portion, provided in the image reading device, that makes contact with a housing of the recording device when the image reading device is in a closed state; a second contact portion, provided in the housing of the recording device, that makes contact with the first contact portion when the image reading device is in a closed state; and a third contact portion, provided in an apparatus frame that holds the recording unit, that makes contact with the housing of the recording device at the lower area of the second contact portion.

According to this configuration, the load of the image reading device can be received by the frame of the recording device, which makes it possible to prevent the housing of the recording device from bending.

In addition, it is preferable for the housing to include two plate portions disposed so as to be separated from each other in the width direction of the recording device; a pair of the second contact portions to be provided corresponding to the two plate portions; and a pair each of the first contact portions and the third contact portions to be provided corresponding to the pair of the second contact portions.

According to this configuration, bending in one of the plate portions is not transmitted to the other plate portion, and thus the housing of the recording device can be suppressed from bending greatly.

In addition, it is preferable for the complex apparatus to further include an information input unit that instructs the recording to be executed, and a pair of support portions, provided in the apparatus frame, that spans the information input unit and supports the information input unit on the apparatus frame, and for the third contact portions to be provided in areas extended from the support portions.

According to this configuration, the load of the image reading device can be received in a favorable manner by using the configuration that includes the support portions, which have a certain degree of height.

In addition, it is preferable for the periphery of the second contact portions of the housing to have shapes that surround the first contact portions that make contact therewith.

According to this configuration, positional skew (looseness) of the image reading device in the depth direction and the width direction of the recording device can be prevented.

In addition, it is preferable for the image reading device to include a sensor for reading an image and a carriage on which the sensor is mounted and that moves; and when the image reading device is in a closed state, for the first contact portion to be disposed below a region of movement of the carriage.

According to this configuration, the area in the image reading device that requires the most rigidity is directly supported, which makes it possible to effectively prevent the unnecessary deformation of the image reading device.

In addition, it is preferable for the carriage to include a motor and a housing portion that houses the motor, and when the image reading device is in a closed state, for the first contact portion to be disposed below the housing portion.

According to this configuration, the area in the image reading device that is the heaviest and that requires the most rigidity is directly supported, which makes it possible to effectively prevent the unnecessary deformation of the image reading device.

A complex apparatus according to another aspect of the invention includes: a recording device including a recording unit that executes recording on a medium; an image reading device, provided so as to be freely openable/closable with respect to the upper portion of the recording device via a hinge portion, including an image reading unit that reads an image; an apparatus frame that holds the recording unit of the recording device; a first contact portion, provided in the image reading device, that makes contact with the apparatus frame when the image reading device is in a closed state; an opening, provided in a housing of the recording device, into which the first contact portion is inserted when the image reading device is in a closed state; and a second contact portion, provided in the apparatus frame, that makes contact with the first contact portion.

According to this configuration, the load of the image reading device can be received by the frame of the recording device, which makes it possible to prevent the housing of the recording device from bending.

In addition, it is preferable for the housing to include two plate portions disposed so as to be separated from each other in the width direction of the recording device; a pair of the openings to be provided corresponding to the two plate portions; and a pair each of the first contact portions and the second contact portions to be provided corresponding to the pair of openings.

According to this configuration, bending in one of the plate portions is not transmitted to the other plate portion, and thus the housing of the recording device can be suppressed from bending greatly.

In addition, it is preferable for the complex apparatus to further include an information input unit that instructs the recording to be executed, and a pair of support portions, provided in the apparatus frame, that spans the information input unit and supports the information input unit on the apparatus frame, and for the second contact portions to be provided in areas extended from the support portions.

According to this configuration, the load of the image reading device can be received in a favorable manner by using the configuration that includes the support portions, which have a certain degree of height.

In addition, it is preferable for the first contact portion and the second contact portion to be formed having complementary shapes.

According to this configuration, positional skew (looseness) of the image reading device in the depth direction and the width direction of the recording device can be prevented.

In addition, it is preferable for the image reading device to include a sensor for reading an image and a carriage on which the sensor is mounted and that moves; and when the image reading device is in a closed state, for the first contact portion to be disposed below a region of movement of the carriage.

According to this configuration, the area in the image reading device that requires the most rigidity is directly supported, which makes it possible to effectively prevent the unnecessary deformation of the image reading device.

In addition, it is preferable for the carriage to include a motor and a housing portion that houses the motor, and when the image reading device is in a closed state, for the first contact portion to be disposed below the housing portion.

According to this configuration, the area in the image reading device that is the heaviest and that requires the most rigidity is directly supported, which makes it possible to effectively prevent the unnecessary deformation of the image reading device.

BRIEF DESCRIPTION OF THE DRAWINGS

The invention will be described with reference to the accompanying drawings, wherein like numbers reference like elements.

FIG. 13 is a cross-sectional view illustrating the vicinity of a seating projection when the scanner unit is in a closed state, seen from the side, according to the second embodiment.

DESCRIPTION OF EXEMPLARY EMBODIMENTS

Figure 1:
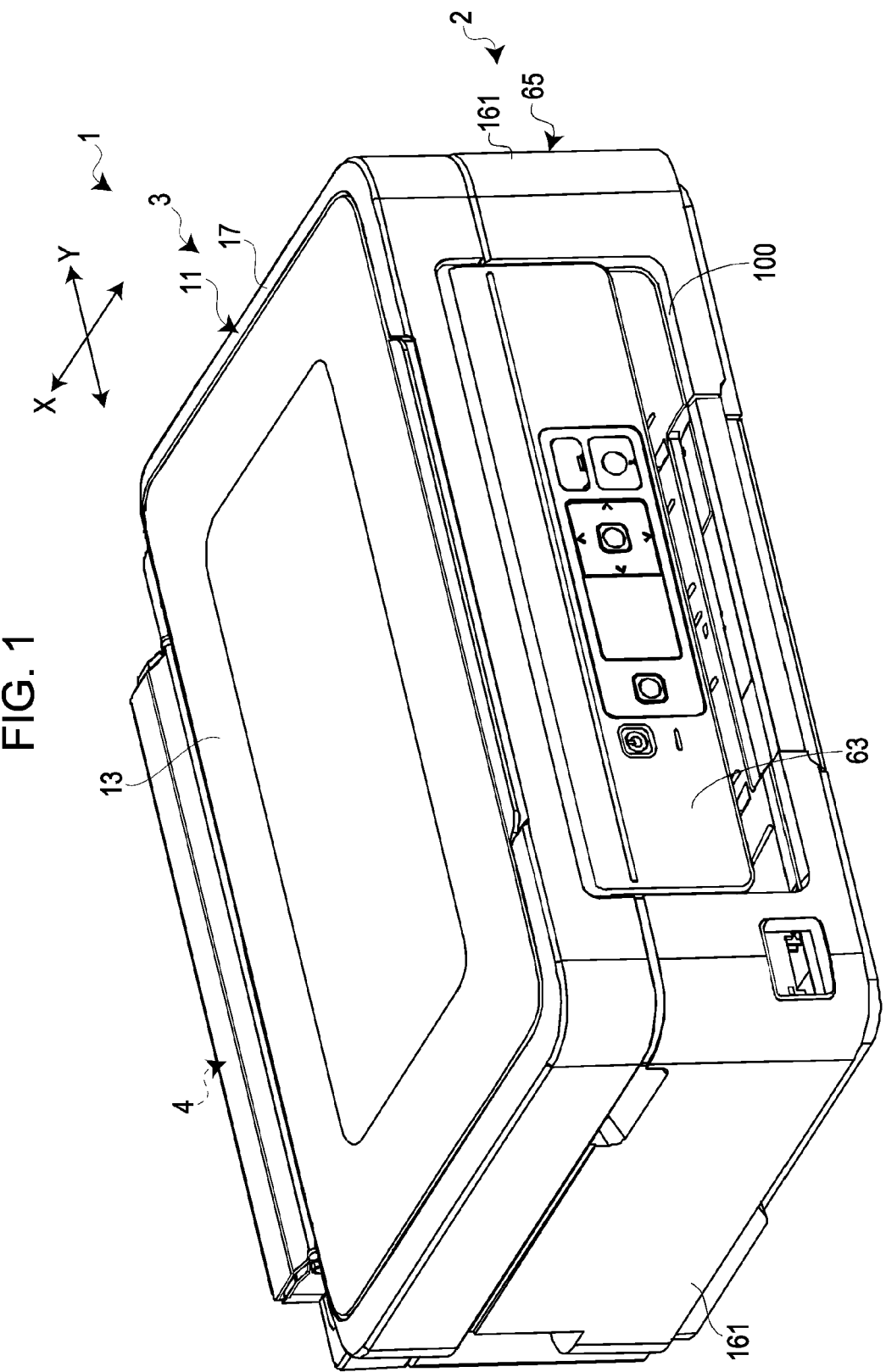
FIG. 1 is an external perspective view illustrating a complex machine according to a first embodiment.

Hereinafter, a complex machine (complex apparatus) 1 in which an image recording apparatus according to the invention is applied will be described with reference to the appended drawings. FIG. 1 is an external perspective view illustrating the complex machine 1. As shown in FIG. 1, the complex machine 1 integrally includes a printer unit (image recording device; a first device) 2, which serves as a main apparatus body, and a scanner unit (image reading device; a second device) 3, which serves as an upper unit disposed above the printer unit 2. Note that the following descriptions will be given assuming that the depth direction in FIG. 1 corresponds to the X axis direction and the horizontal direction corresponds to the Y axis direction.

Figure 2:
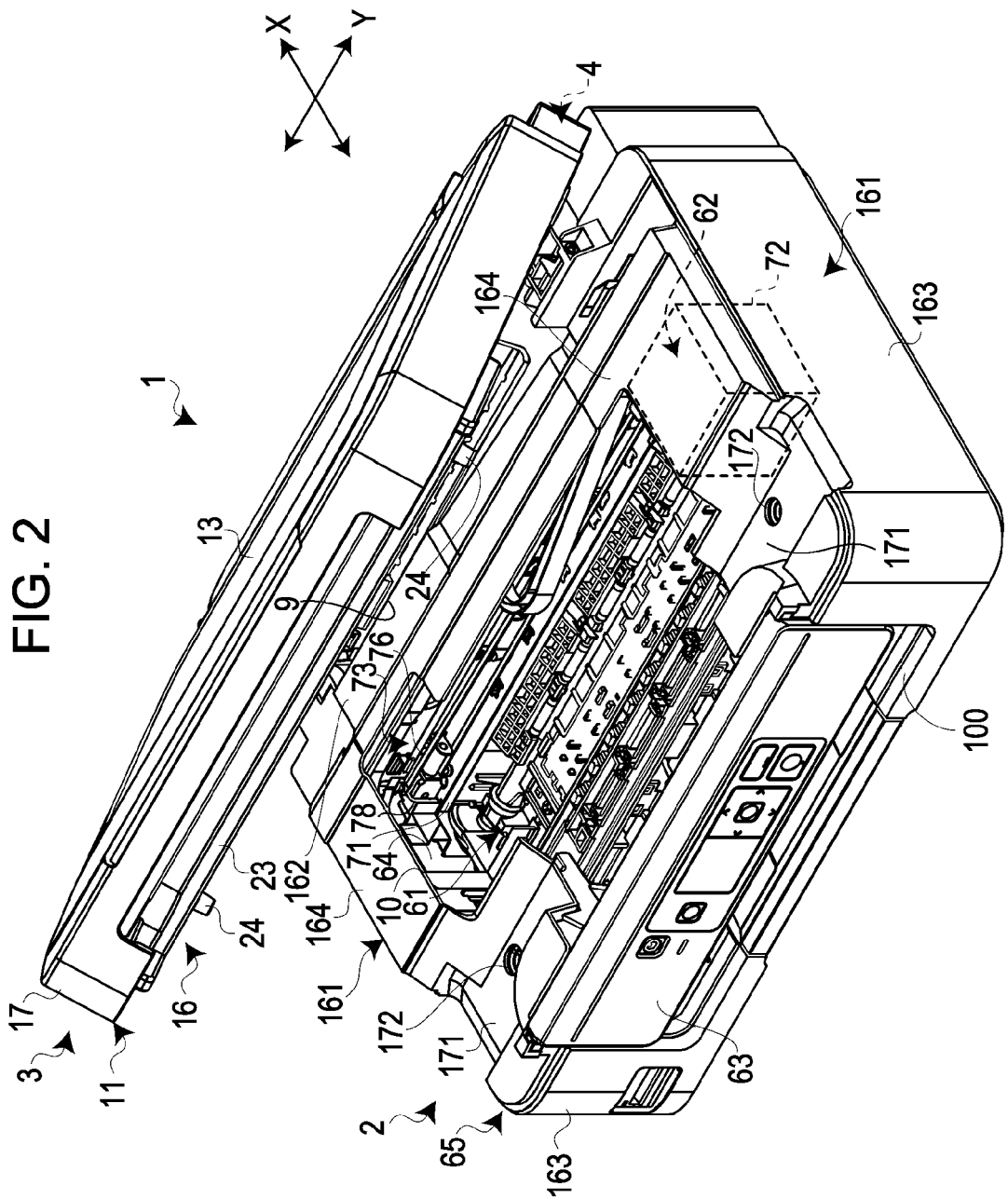
FIG. 2 is a perspective view illustrating the complex machine when a scanner unit is in an open state.

FIG. 2 is a perspective view illustrating the complex machine 1 when the scanner unit 3 is in an open state. As shown in FIG. 1 and FIG. 2, the scanner unit 3 is supported on the printer unit 2 through a hinge portion 4 provided at the rear end of the scanner unit 3, in a freely pivotable state, and covers the top of the printer unit 2 in a freely openable/closable state. In other words, an upper surface opening 10 in the printer unit 2 is exposed by raising the scanner unit 3 in the pivoting direction, and the interior of the printer unit 2 is exposed through the upper surface opening 10 (an open state; see FIG. 2). On the other hand, by lowering the scanner unit 3 in the pivoting direction and placing the scanner unit 3 upon the printer unit 2, the upper surface opening 10 is covered by the scanner unit 3 (a closed state; see FIG. 1). In this manner, the configuration is such that an ink cartridge 84 can be replaced, paper jams can be removed, and so on, by opening the scanner unit 3.

Figure 3:
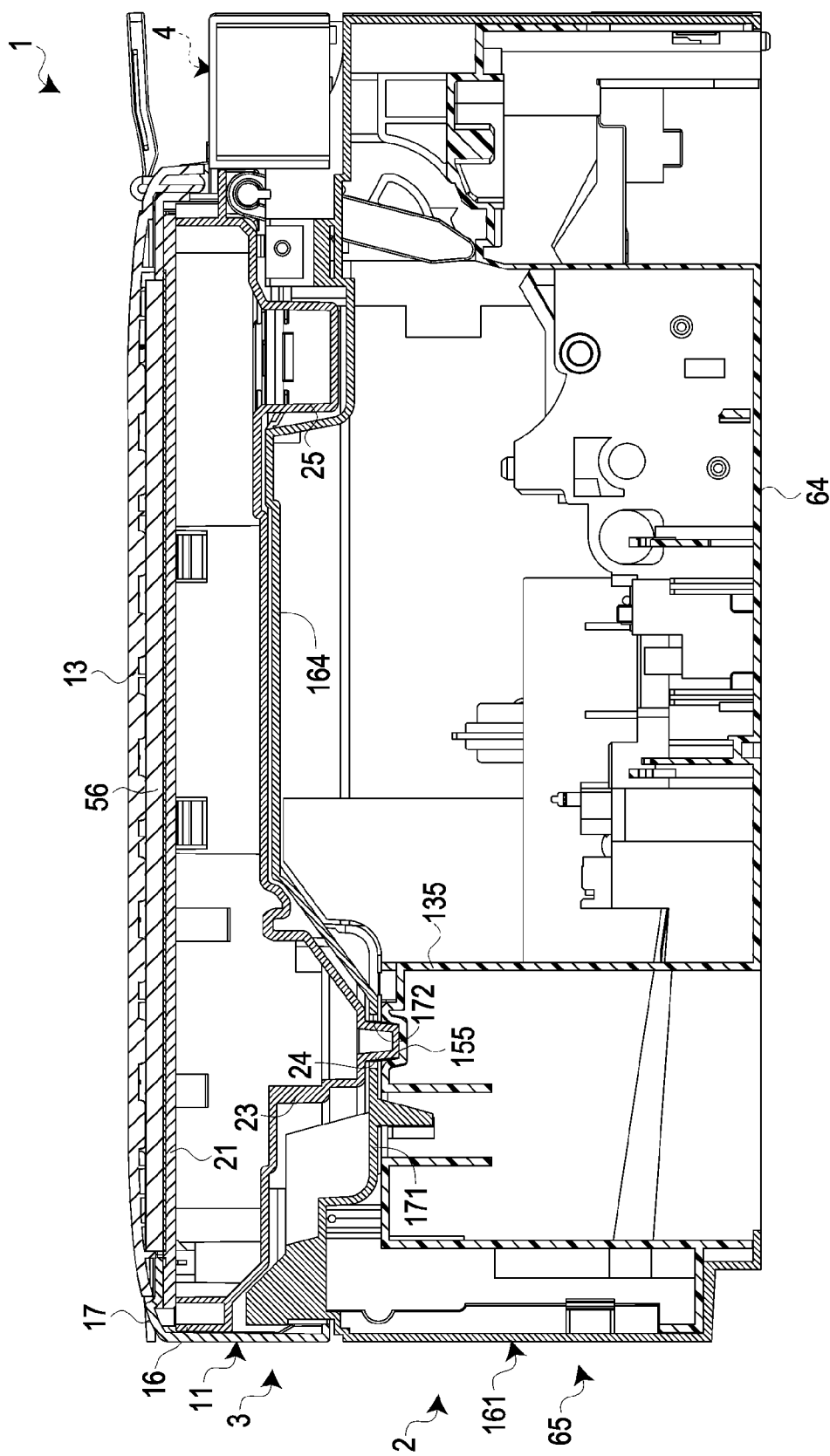
FIG. 3 is a cross-sectional view of the complex machine, seen from the side.

FIG. 3 is a cross-sectional view of the complex machine 1, seen from the side. As shown in FIG. 2 and FIG. 3, the scanner unit 3 includes: an upper frame 11, serving as an enclosure; an image reading unit 12 housed within the upper frame 11 (see FIG. 4); and a top cover 13 supported on an upper portion of the upper frame 11 in a freely-pivotable state. Furthermore, although details will be given later, components of the scanner unit 3 for the aforementioned hinge portion 4 are provided in a rear end portion of the upper frame 11.

Figure 4:
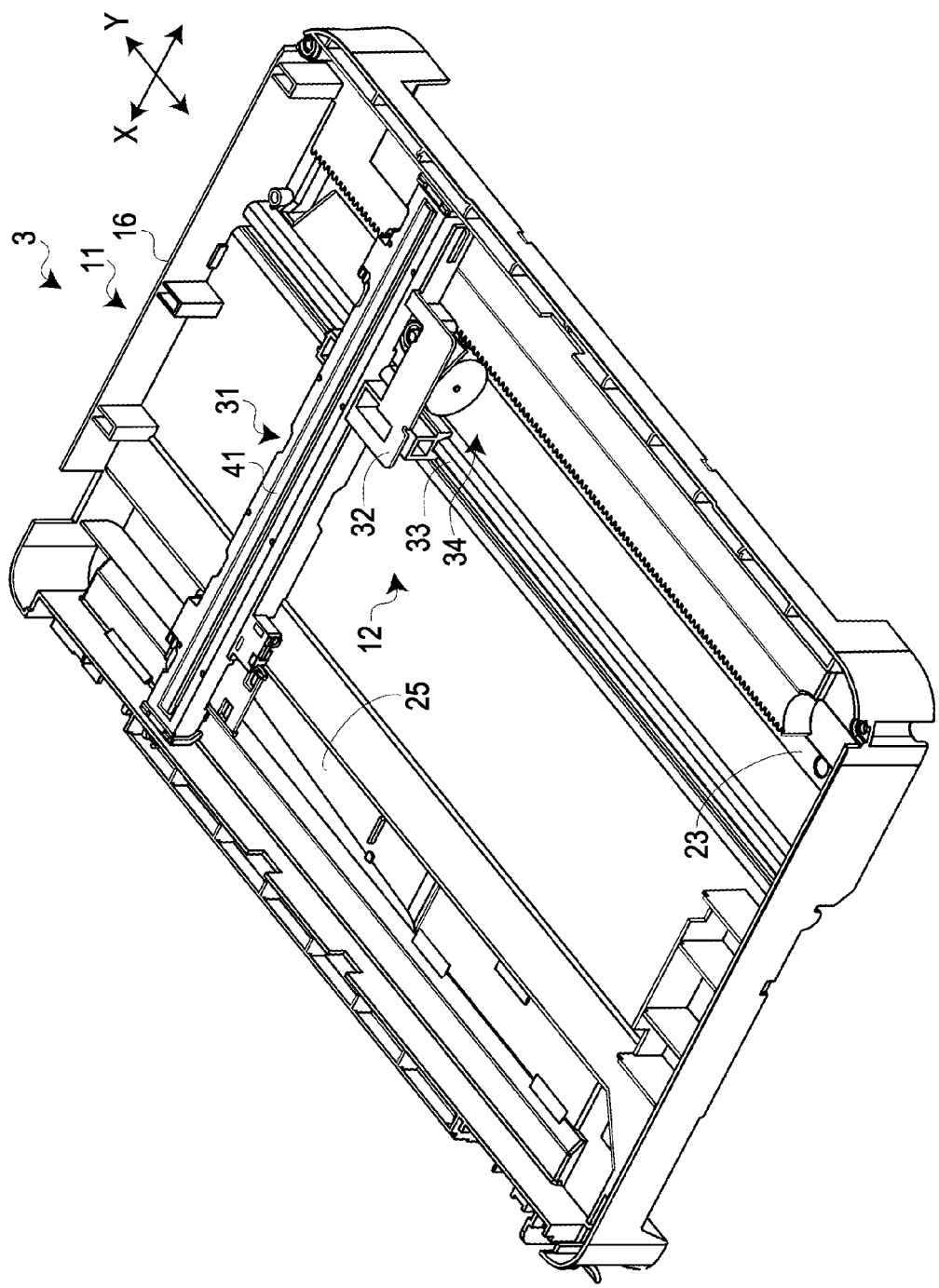
FIG. 4 is a perspective view illustrating the internal structure of the scanner unit.

FIG. 4 is a perspective view illustrating the internal structure of the scanner unit 3. As shown in FIG. 3 and FIG. 4, the upper frame 11 includes a box-shaped lower case 16 that houses the image reading unit 12, and an upper case 17 that covers the top surface of the lower case 16. A document placement plate (document platform) 21, configured of glass, is disposed across the upper case 17, and a medium to be read is placed thereupon with its reading surface facing downward. Meanwhile, the lower case 16 is formed as a shallow box whose upper surface is open. An allowance recess 23, serving as a space in which a sensor carriage 32 (mentioned later)

moves, is formed in the base surface of the lowercase 16 in a frontal area thereof, whereas a housing recess 25 that houses a cable (not shown) whose one end is connected to a sensor unit 31 (also mentioned later) is formed in the base surface of the lower case 16 in a rear area thereof. Furthermore, a pair of left and right seating projections 24, for seating the scanner unit 3 on the printer unit 2, are erected in the bottom surface of the allowance recess 23 (details will be given hereinafter).

As shown in FIG. 4, the image reading unit 12 includes: the sensor unit 31, which is a line sensor; the sensor carriage 32, in which the sensor unit 31 is mounted; a guide shaft 33 that extends in the Y axis direction and supports the sensor carriage 32 in a freely slidable state; and a self-propelled sensor movement mechanism 34 that moves the sensor carriage 32 along the guide shaft 33. The sensor unit 31 has an image sensor (sensor unit) 41, which is a CCD (charge-coupled device) line sensor that extends in the X axis direction, and is moved back and forth in the Y axis direction along the guide shaft 33 by the motor-driven sensor movement mechanism 34. Through this, an image of a medium to be read (a document) on the document placement plate 21 is read. Note that the pair of seating projections 24 is disposed directly below the trajectory of the center of gravity of the moving sensor carriage 32, with the seating projections 24 distanced from each other in the Y axis direction.

Figure 5:
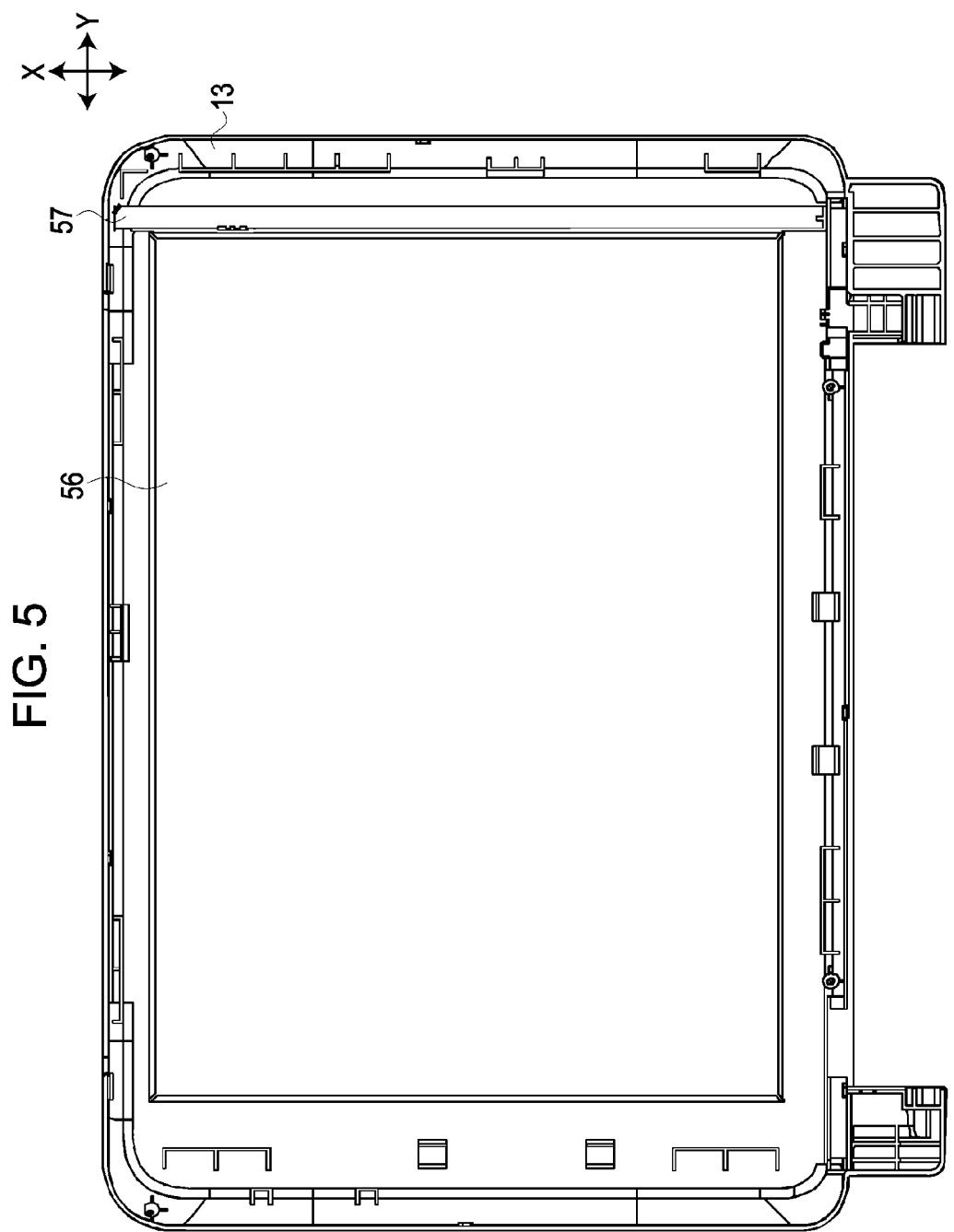
FIG. 5 is a bottom view illustrating a top cover of the scanner unit.

FIG. 5 is a bottom view of the top cover 13, looking up at the top cover 13 from below. As shown in FIG. 5, a white document suppression board 56 disposed so as to oppose the document placement plate 21, and a calibration reference member 57 that is disposed adjacent to the document suppression board 56 in the Y axis direction (scanning direction) and that serves as a calibration reference for the sensor unit 31, are disposed on the top cover 13. When the scanner unit 3 is turned on, white color reference calibration and positional reference calibration for the sensor unit 31 are carried out by moving the sensor unit 31 and capturing an image of the calibration reference member 57.

Meanwhile, as shown in FIG. 2, the printer unit 2 includes: a transport unit 61 that sends a sheet-shaped recording medium (print paper; single sheets of paper) along a transport path R; a printing unit 62, disposed above the transport path R (see FIG. 5), that carries out an ink jet printing process on the recording medium; a panel-type operation unit 63 disposed on the front surface; an apparatus frame 64 in which the transport unit 61, the printing unit 62, and the operation unit 63 are mounted; and an apparatus housing 65 that covers the aforementioned elements. Furthermore, although not shown, a USB port and a power supply port are provided in a lower area of the rear surface. In other words, the complex machine 1 is configured so as to be capable of connecting to a computer or the like via the USB port.

Figure 6:
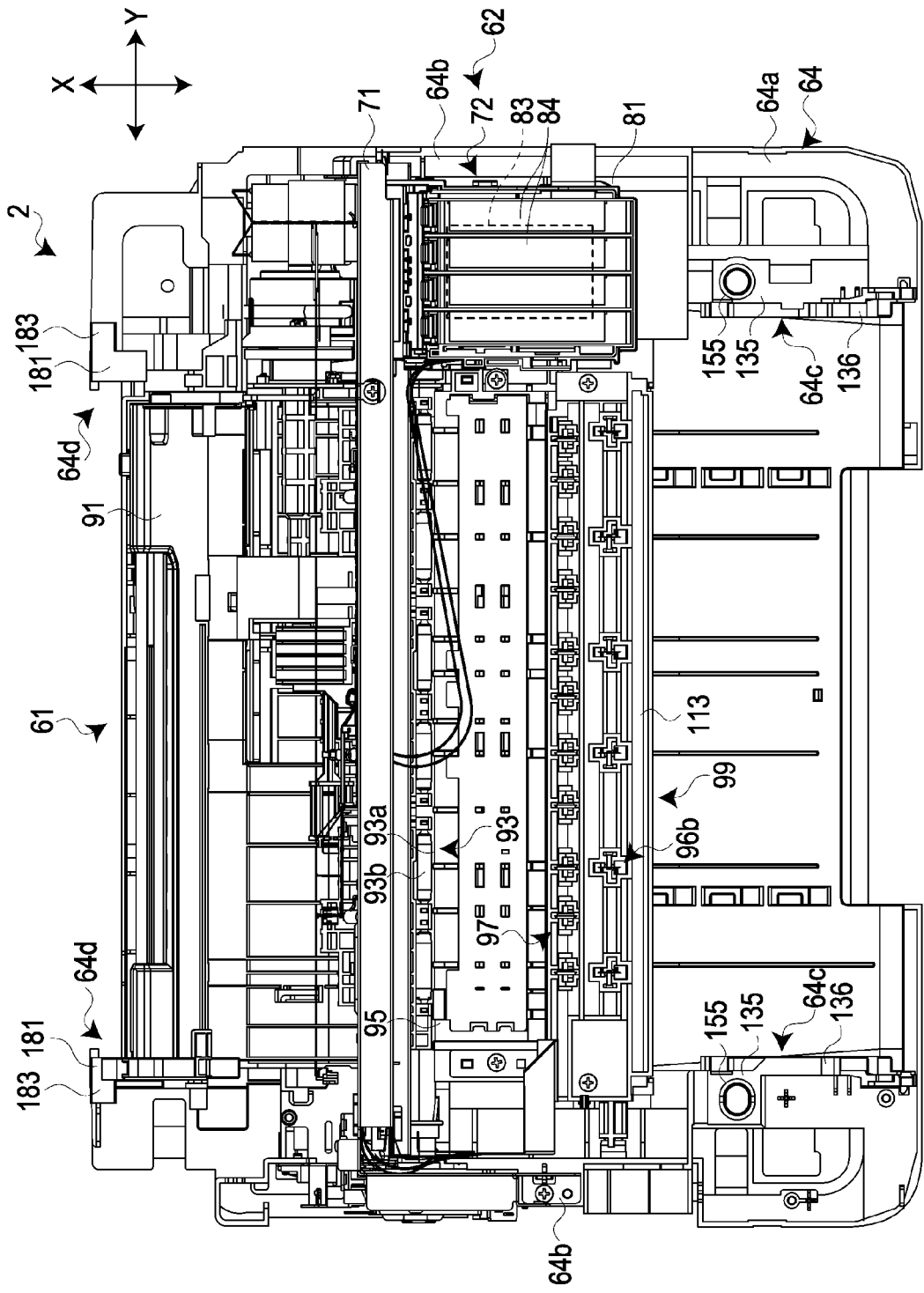
FIG. 6 is a plan view illustrating the internal structure of a printer unit.
Figure 7:
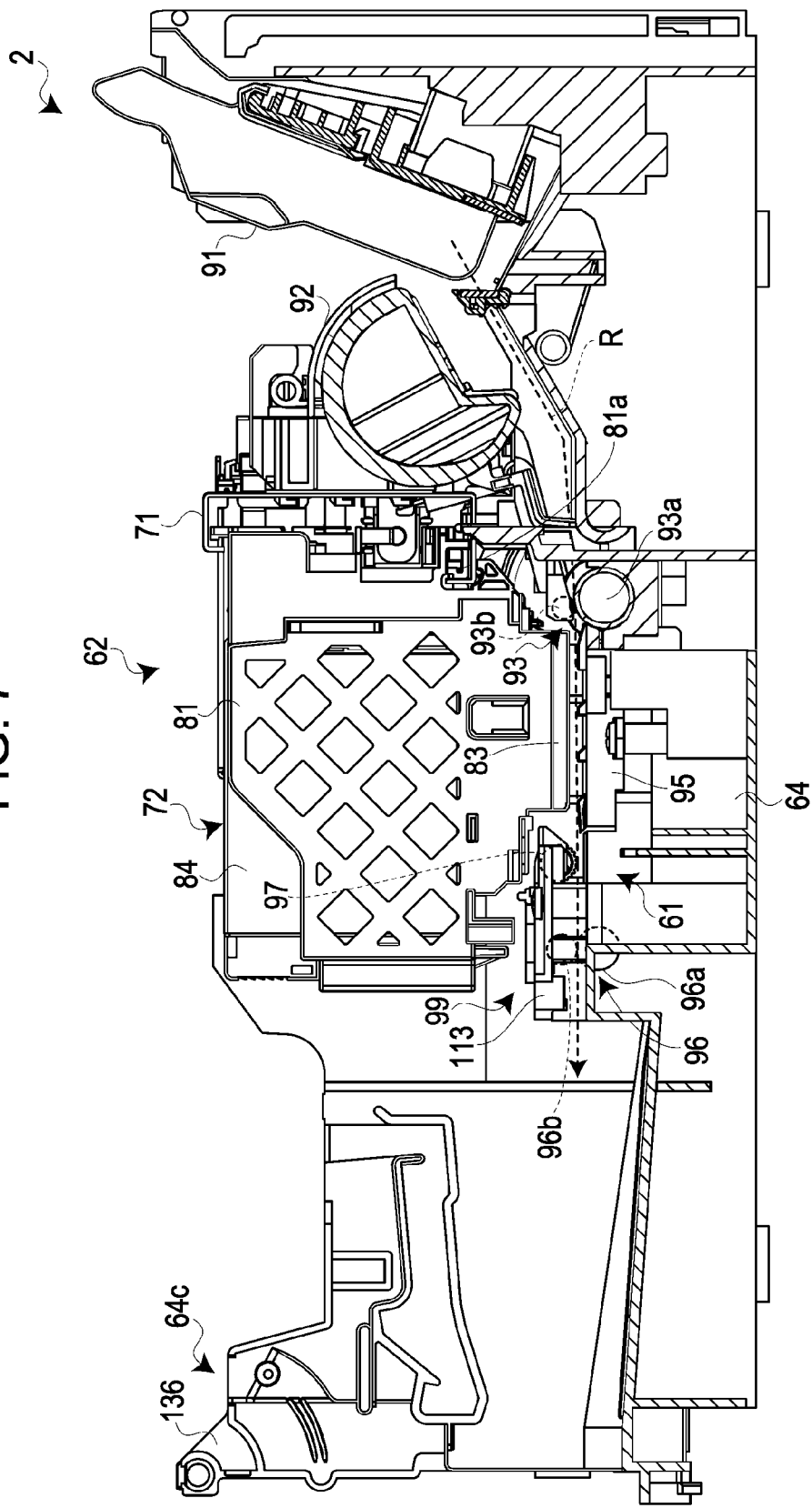
FIG. 7 is a cross-sectional view illustrating the internal structure of the printer unit, seen from the side.

FIG. 6 is a plan view illustrating the internal structure of the printer unit 2. FIG. 7, meanwhile, is a cross-sectional view illustrating the internal structure of the printer unit 2, seen from the side. As shown in FIGS. 2, 6, and 7, the printing unit 62 includes: a guide frame 71, configured of metal plates, that is supported by the apparatus frame 64 and extends along the entire width in the Y axis direction; a carriage unit 72 supported by the guide frame 71 so as to move freely back and forth; and a carriage movement mechanism 73 (see FIG. 2) that moves the carriage unit 72 back and forth along the guide frame 71. An ink jet head 83 is mounted in the carriage unit 72.

The guide frame 71 is formed so as to have a "C" shape when viewed cross-sectionally, and an interlocking slider portion 81a of the carriage unit 72 interlocks with the top and bottom thereof. Through this, the carriage unit 72 is fitted into the guide frame 71 and supported on one side so as to be capable of moving back and forth in the extension direction (the Y axis direction), or in other words, so as to be capable of sliding. The carriage movement mechanism 73 includes: a timing belt 76 that extends along the guide frame 71; a primary pulley (not shown) and a slave pulley 78 upon which the timing belt 76 is stretched; a linking/anchoring member (not shown) that links the timing belt 76 to the carriage unit 72 (a carriage 81); and a carriage motor (not shown) that drives the primary pulley. When the carriage motor rotates forward or backward, the carriage unit 72 moves back and forth in the Y axis direction (the horizontal direction) via the timing belt 76. The main scans are carried out by driving the ink jet head 83 in the carriage unit 72 to perform ejecting operations during this back-and-forth movement.

As shown in FIG. 6 and FIG. 7, the carriage unit 72 includes: the box-shaped carriage 81, which is supported by the guide frame 71 via the interlocking slider portion 81a so as to be capable of freely moving back and forth; the ink jet head 83, which is embedded in the bottom surface of the carriage 81 in an integrated state; and four ink cartridges 84 that are housed in the carriage 81 in a detachable manner. The ink jet head 83 has four nozzle rows (not shown) that eject four colors of ink droplets, and the four ink cartridges 84, which hold four colors of ink, are directly connected to the upper side of the ink jet head 83 by mounting the four ink cartridges 84 in the carriage 81. The four nozzle rows in the ink jet head 83 extend parallel to each other in the X axis direction, and are disposed facing downward toward the recording medium that is sent with a predetermined paper gap therebetween.

As shown in FIG. 7, the transport unit 61 includes: a mobile paper tray 91 in which the recording medium is set aligned to the right; a separation roller 92 that separates and feeds out the recording medium from the paper tray 91 one sheet at a time; paper supply rollers 93, positioned downstream from the separation roller 92, that feed the recording medium to the printing unit 62 along the transport path R; a medium regulation member (this corresponds to a platen) 95, positioned downstream from the paper supply roller 93, that opposes the ink jet head 83; a serrated guide roller 97 positioned downstream from the medium regulation member 95; and discharge rollers 96, positioned downstream from the guide roller 97, that discharge the recording medium from a discharge port 100 (see FIG. 2).

The paper supply rollers 93 are configured of nipping rollers including a lower paper supply driving roller 93a and an upper paper supply slave roller 93b. Likewise, the discharge rollers 96 are configured of nipping rollers including a lower discharge driving roller 96a and an upper discharge slave roller 96b. The guide roller 97 and the discharge slave roller 96b are supported by a roller frame 113 that is independent of the apparatus frame 64, and configures a roller assembly 99. The paper supply rollers 93 function as main rollers that control the feeding (sub scanning) of the recording medium, whereas the discharge rollers 96 function as tension rollers that apply tension to the recording medium positioned above the medium regulation member 95.

The recording medium (which is fed from the paper tray 91 by the separation roller 92) is sent intermittently in the X axis direction toward the discharge rollers 96 along the top of the medium regulation member 95 by the paper supply rollers 93 (sub scanning). In synchronization with this intermittent feeding, the carriage unit 72 selectively ejects ink while moving back and forth in the Y axis direction (that is, the carriage unit carries out main scans), thus carrying out the desired printing. Meanwhile, the leading edge of the recording medium that has passed the medium regulation member 95 and reached the guide roller 97 is fed into the discharge rollers 96, with the guide roller 97 correcting upward curls. In this manner, the recording medium on which the print has been completed is discharged to the front by the discharge rollers 96, through the discharge port 100.

Figure 8:
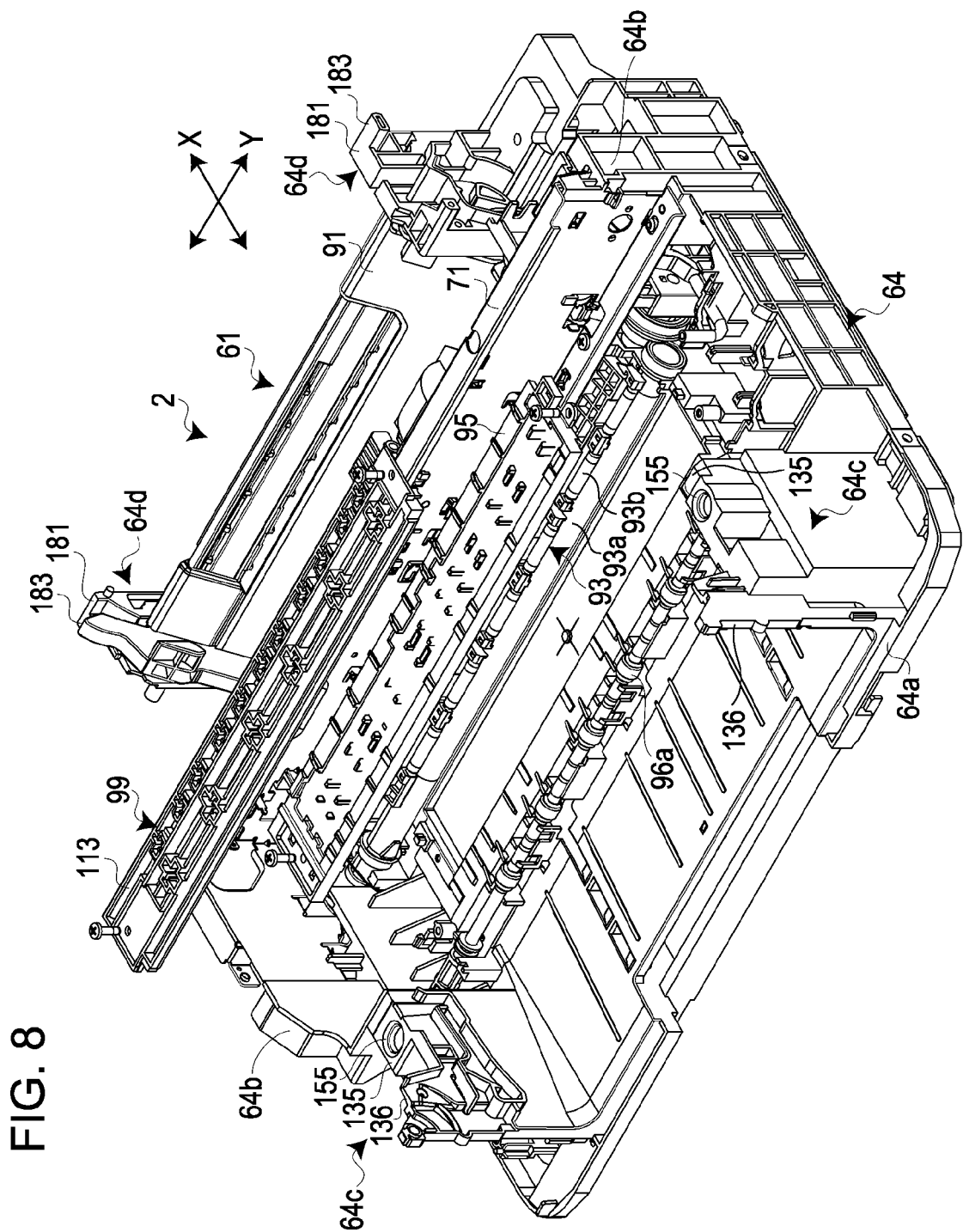
FIG. 8 is an exploded perspective view illustrating the internal structure of the printer unit.

Here, the apparatus frame 64, the upper frame 11, and the apparatus housing 65 will be described in detail with reference to FIG. 2, FIGS. 8 through 10. FIG. 8 is an exploded perspective view illustrating the internal structure of the printer unit 2.

As shown in FIG. 8, the apparatus frame 64 is a frame that supports the various elements of the printer unit 2, and is configured of a resin that is formed as a single entity. Specifically, the apparatus frame 64 includes: a base frame portion 64a; a pair of left and right side frame portions 64b, erected from the base frame portion 64a, that support the various constituent elements of the transport unit 61 and the guide frame 71 with both sides; a pair of left and right front frame portions 64c that support the front of the scanner unit 3 and support the operation unit 63 on the front of the base frame portion 64a; and a pair of left and right rear frame portions 64d that support the printer unit 2 in a freely openable/closable state via the hinge portion 4 on the rear of the base frame portion 64a.

The front frame portions 64c each include a pair of reinforcing support portions 135 that receive the front area of the scanner unit 3 and a pair of operation support portions 136 that support the operation unit 63 in a freely-tiltable manner. Each of the reinforcing support portions 135 extends along the vicinity of the upper surface of the apparatus housing 65, and includes a seating receiving portion 155 thereupon that directly receives the corresponding seating projection 24 of the stated scanner unit 3. Each seating receiving portion 155 is formed as a recess, in an inverted conical trapezoidal shape that has a shape complementary to that of the corresponding seating projection 24, and the seating projections 24 are seated thereon by fitting therewith. Meanwhile, the pair of seating receiving portions 155 in the pair of reinforcing support portions 135 are formed so that one is circular when viewed from above and the other is formed as a rectangle with rounded corners that extends to the left and right (see FIG. 6). This allows for the error in the positional precision between the seating projections 24.

The rear frame portions 64d include a pair of lower hinge portions 181 (first attachment portions) that configure part of the hinge portion 4, and a pair of hinge pins 183 that link the pair of lower hinge portions 181 to a pair of upper hinge portions 182, mentioned later, that are provided in the scanner unit 3.

As shown in FIG. 2, the apparatus housing 65 includes a pair of left and right side housings 161 that configure left and right sheathings of the printer unit 2, and a linking housing 162 that links the pair of side housings 161 at the location of the aforementioned guide frame 71. Each of the side housings 161 is formed of a side surface plate portion 163, having a sideways U shape when viewed from above, that covers the front, left, right, and rear surfaces, and an upper plate portion (plate portion) 164 that covers the upper surface; these portions are formed as a single entity. In other words, the pair of side housings 161 are configured so as to attach to the apparatus frame 64 from the left and right. The two upper plate portions 164 are formed in a shape of a square with one side open when viewed from above, and are disposed so as to be separated from each other in the width direction (the Y axis direction) of the complex machine 1. In other words, the upper surface opening 10 of the apparatus housing 65 is formed by the region enclosed by the pair of upper plate portions 164 and the linking housing 162. Furthermore, a rear opening 9 is formed on the rear of the linking housing 162. The rear opening 9 is configured of a paper opening with the paper tray 91 and supplying the recording medium to the interior of the apparatus, and a pair of hinge openings, which are provided on the left and right sides of the paper opening, for disposing the hinge portion 4. Note that the "upper plate" referred to in the aspects of the invention is configured of the two upper plate portions 164.

A seating recess 171 that corresponds to the allowance recess 23 of the upper frame 11 and is formed as a recess that has a shape complimentary thereto, and a pair of seating openings 172 formed in the seating recess 171 in correspondence with the pair of seating projections 24, are formed in each of the upper plate portions 164. Furthermore, the aforementioned seating receiving portions 155 formed in the reinforcing support portions 135 are provided beyond each of the seating openings 172. In addition, the seating openings 172 are formed in shapes that correspond to the seating receiving portions 155. In other words, one of the seating openings 172 is circular when viewed from above, whereas the other is a rectangular shape with rounded corners when viewed from above.

Figure 9:
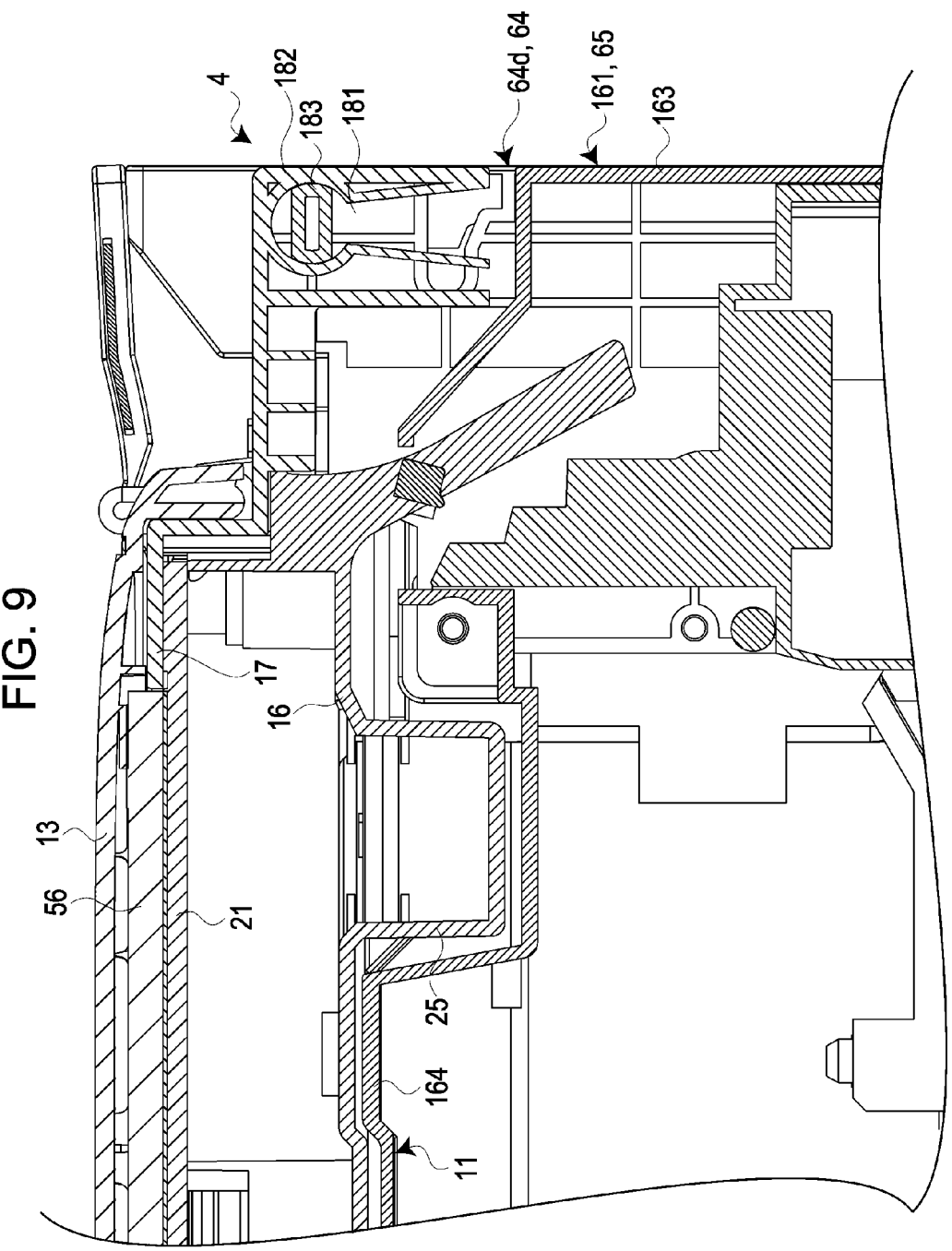
FIG. 9 is a cross-sectional view of the vicinity of a hinge portion, seen from the side.
Figure 10:
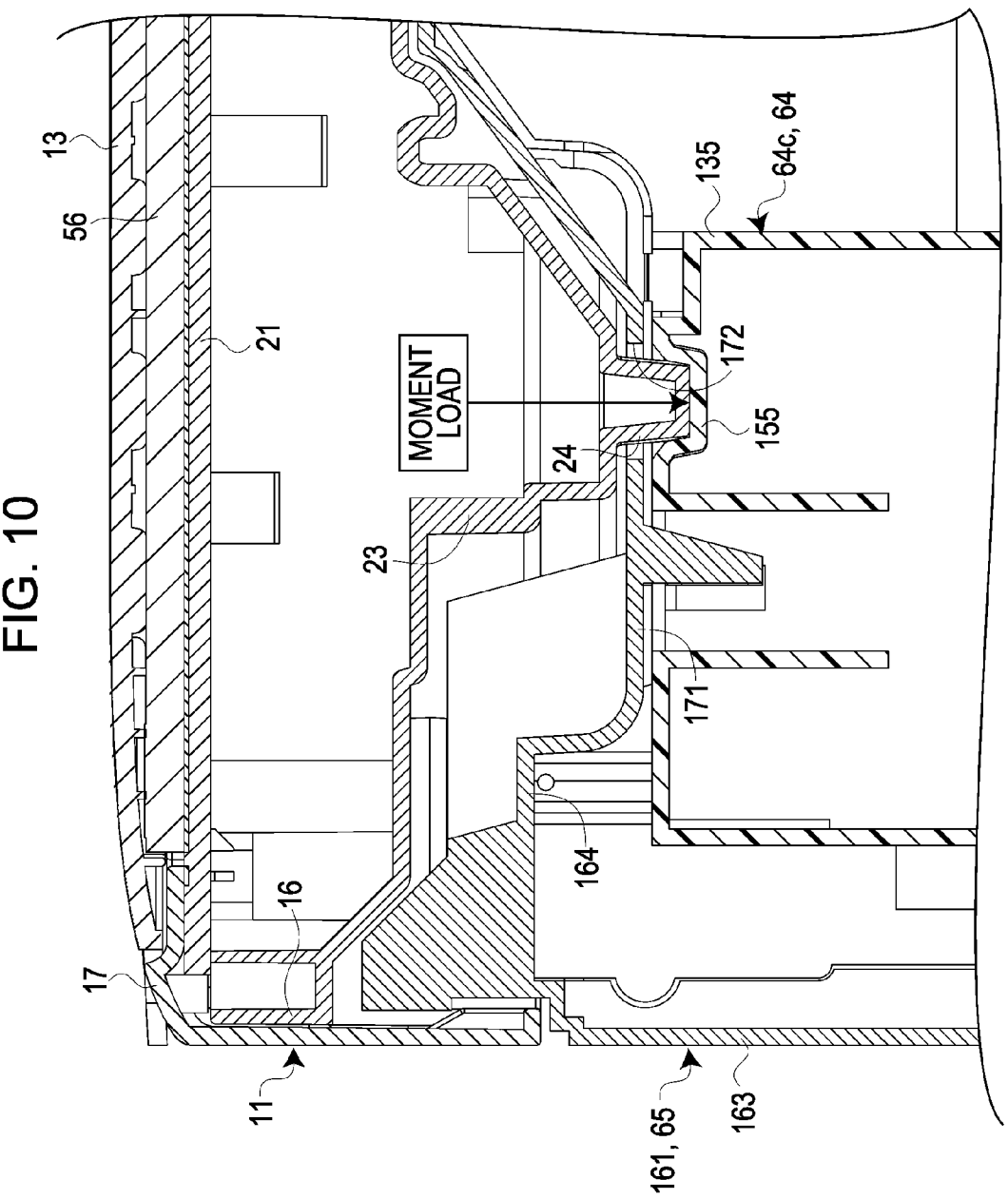
FIG. 10 is a cross-sectional view illustrating the vicinity of a seating projection when the scanner unit is in a closed state, seen from the side.

FIG. 9 is a cross-sectional view of the vicinity of the hinge portion 4, seen from the side. FIG. 10, meanwhile, is a diagram illustrating the vicinity of the seating projection 24 when the scanner unit 3 is in the closed state. As shown in FIG. 9 and FIG. 10, the pair of left and right upper hinge portions (second attachment portions) 182 (see FIG. 9) formed integrally with the upper case 17, and the pair of left and right seating projections 24 (see FIG. 10) projecting from the lower surface of the allowance recess 23 in the lower case 16, are provided in the upper frame 11. The pair of upper hinge portions 182 configure (along with the aforementioned pair of lower hinge portions 181 and the pair of hinge pins 183) the hinge portion 4 that links the printer unit 2 and the scanner unit 3 in a freely-pivotable state.

The pair of seating projections 24 are disposed so as to be parallel in the Y axis direction directly below the trajectory of the center of gravity of the moving sensor carriage 32. Furthermore, each seating projection 24 is formed in an inverse conical trapezoidal shape, and is formed integrally with the lower case 16. In other words, when the scanner unit 3 is closed, each seating projection 24 fits into the corresponding seating receiving portion 155 of the front frame portion 64c (the reinforcing support portion 135) via the seating opening 172 in the upper plate portion 164.

As shown in FIG. 10, when the scanner unit 3 is placed on top of the printer unit 2 with the scanner unit 3 in the closed state, the pair of seating projections 24 fit into the pair of seating openings 172, and are seated upon the respective seating receiving portions 155 of the pair of reinforcing support portions 135. In other words, the pair of seating projections 24 are directly supported by the pair of reinforcing support portions 135. In this manner, the reinforcing support portions 135 receive and directly support the seating projections 24 of the scanner unit 3; accordingly, the moment load of the scanner unit 3, whose support point is the hinge portion 4 (that is, the weight of the scanner unit 3), can be directly supported by the reinforcing support portions 135. Accordingly, the scanner unit 3 can be supported in a favorable manner. Furthermore, because the seating projections 24 fit into the seating openings 172 formed in the upper plate portions 164, the moment load of the scanner unit 3 is not exerted on the upper plate portion 164, and thus the upper plate portion 164 does not bend.

Figure 11:
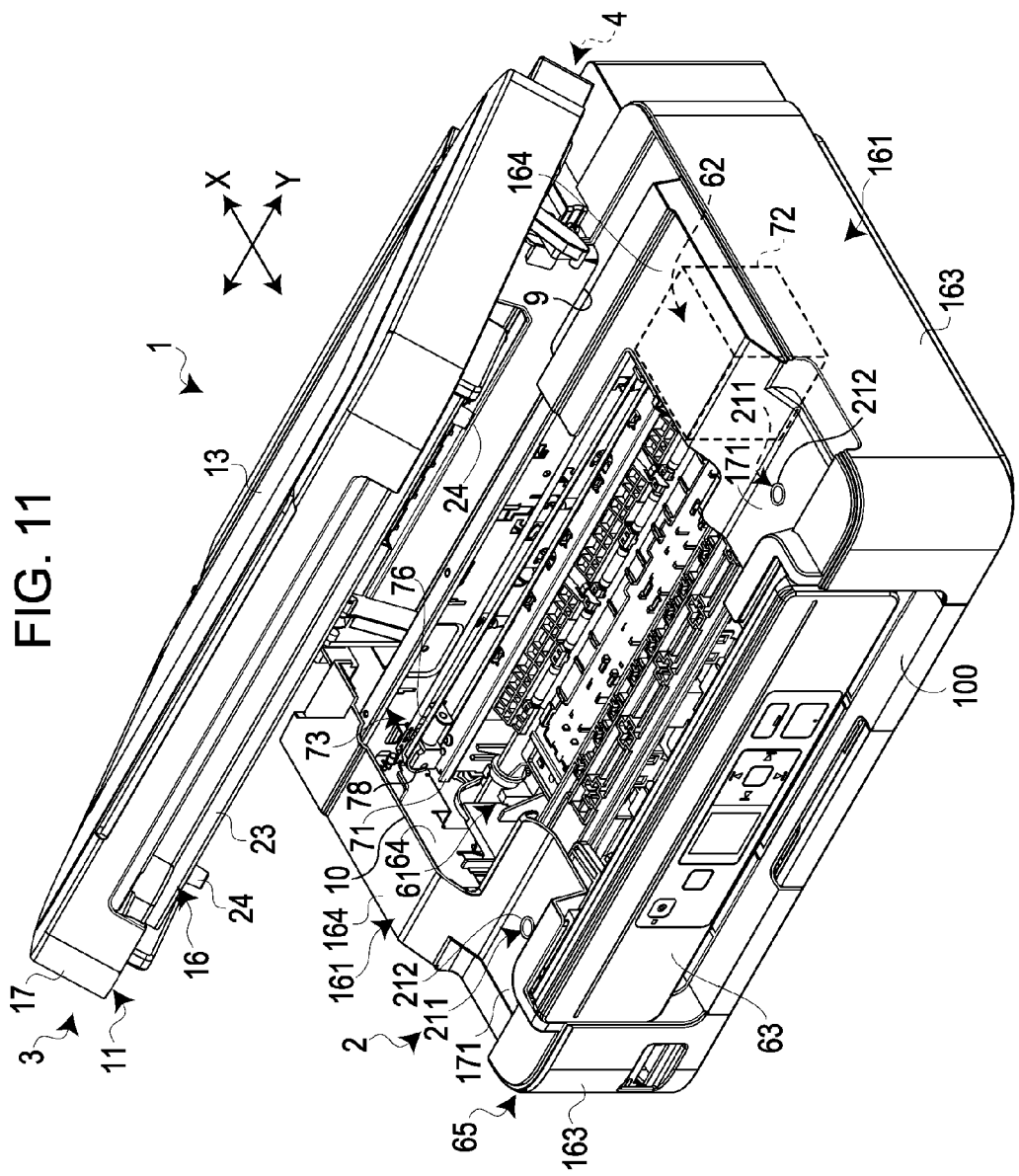
FIG. 11 is a perspective view illustrating a complex machine when a scanner unit is in an open state, according to a second embodiment.
Figure 12:
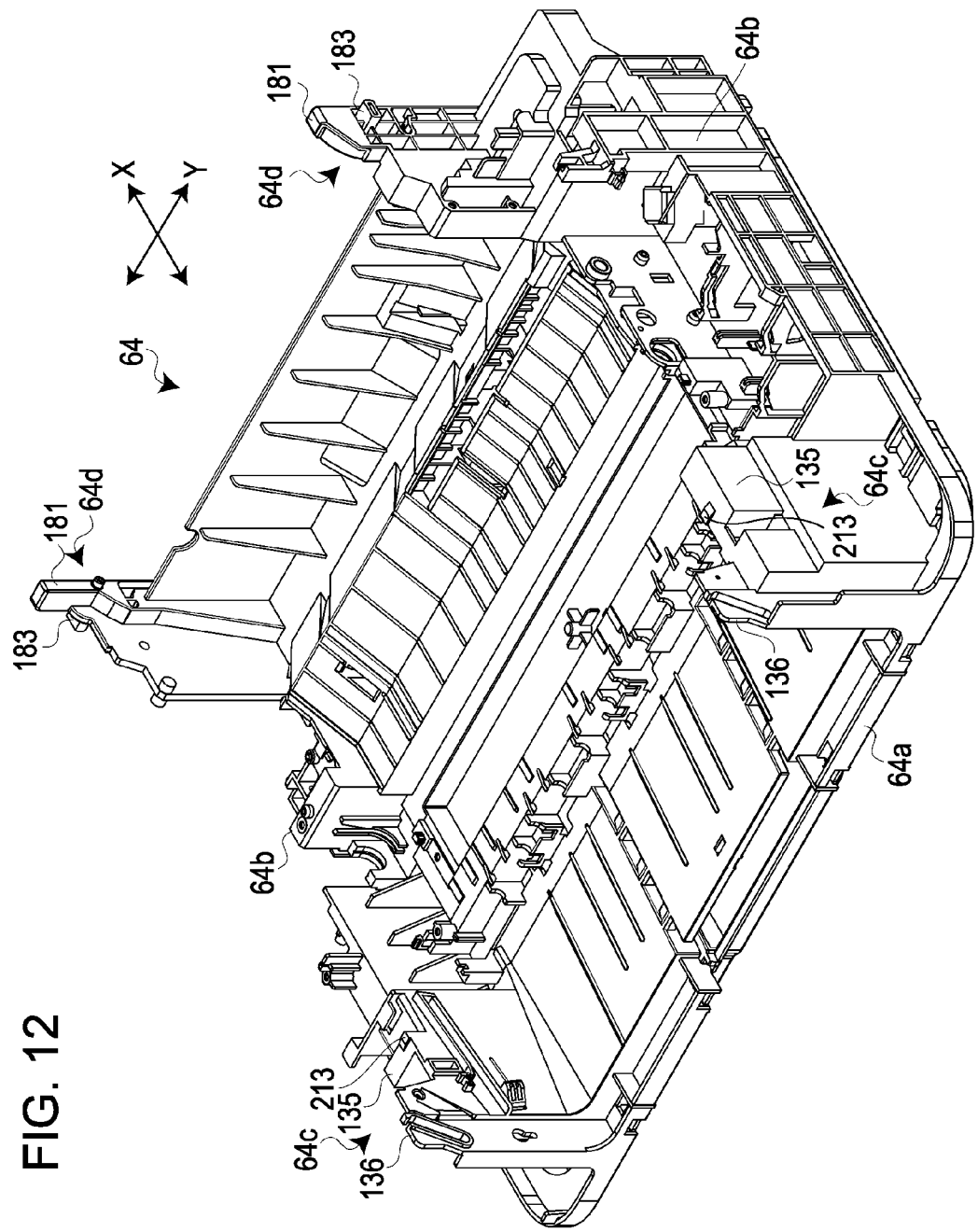
FIG. 12 is a perspective view illustrating an apparatus frame according to the second embodiment.

Next, a second embodiment of the complex machine 1 will be described with reference to FIGS. 11 through 13, with the descriptions focusing only on the points that differ from the complex machine 1 according to the first embodiment. The seating projections 24 in this embodiment are, as in the first embodiment, formed integrally with the lower case 16, and are formed so as to have an inverse conical trapezoidal shape. However, as shown in FIG. 11 and FIG. 13, each upper plate portion 164 has a seating portion 211 instead of the seating opening 172. Each seating portion 211 has a ring-shaped projection 212 that surrounds the corresponding seated seating projection 24. In this case, as shown in FIG. 12 and FIG. 13, each reinforcing support portion 135 is disposed below the corresponding seating portion 211, and a contact portion 213 that supports the corresponding upper plate portion 164 from below is formed in the upper surface thereof.

In other words, each reinforcing support portion 135 is disposed (i.e., formed) so as to block the corresponding upper plate portion 164 from bending. In this manner, the reinforcing support portions 135, which serve as support structures for the moment load of the scanner unit 3, support the upper plate portions 164 so as to block the upper plate portions 164 from bending, and thus the upper plate portions 164 can be effectively prevented from bending. Accordingly, the scanner unit 3 can be supported in a favorable manner by portions in the upper plate portions 164 of the printer unit 2.

Although the configuration in this embodiment is such that the seating projections 24 are formed so as to extend (project) from the lowermost area of the allowance recess 23 in the lower case 16, and the seating is carried out on these projecting portions, it should be noted that the configuration may be such that the lowermost area of the allowance recess 23 itself is used as the seating projections 24. In other words, the projecting portions may be omitted, and the seating may be carried out directly on the lower surfaces of the lowermost area of the allowance recess 23. However, providing the seating projections 24 so as to project from the lowermost area of the allowance recess 23, as in this embodiment, makes it possible to adjust the height using a method for shaving down the seating projections 24, which makes it easy to make subtle adjustments to the height thereof.

Meanwhile, with respect to the seating portions 211, the ring-shaped projections 212 that extend (project) from the upper plate portions 164 are provided in this embodiment. However, the configuration may be such that such ring-shaped projections 212 that project are not provided. Furthermore, although the contact portions 213 extend (project) from the reinforcing support portions 135 in this embodiment, the contact portions 213 are also not absolutely necessary. The configuration may be such that the contact portions 213 are omitted, and the support is carried out directly by the reinforcing support portions 135 (that is, the upper surfaces thereof). However, in the case where the contact portions 213 are not provided, the area of contact with the upper plate portions 164 is widened, and thus a corresponding degree of precision in the components is necessary. On the other hand, providing the contact portions 213 makes it possible to adjust the height using a method for shaving down the contact portions 213, as is the case with the aforementioned seating projections 24, which makes it easy to make subtle adjustments to the height thereof.

According to the configurations of the aforementioned embodiments, the scanner unit 3 can be supported in a favorable manner without the upper plate portions 164 bending, by using the stated support structure for the moment load. Accordingly, it is not necessary to consider interference with the inner units caused by bending in the upper frame portions 164, which makes it possible to suppress the apparatus as a whole from increasing in size.

In addition, by configuring the reinforcing support portion 135 of part of the apparatus frame 64, and thus configuring the apparatus frame 64 from a resin formed as a single entity, the number of components can be reduced, and the force received by the reinforcing support portion 135 can be dissipated appropriately.

Furthermore, by forming the shaft sides of the hinge portion 4 (that is, the lower hinge portions 181 and the hinge pins 183) integrally with the apparatus frame 64, the force received by the hinge portion 4 can be dissipated appropriately.

In addition, by disposing the seating projections 24 directly below the trajectory of the center of gravity of the sensor carriage 32, the area in the printer unit 2 that requires the most rigidity is directly supported, which makes it possible to effectively prevent the unnecessary deformation of the printer unit 2. Although not explicitly referred to in the aforementioned embodiments, it should be noted that the center of gravity of the sensor carriage 32 is the center of the weight of the sensor carriage 32 including the various members mounted thereon.

Of course, if, of the members that are mounted, the sensor carriage 32, and so on, there is a member that makes up a large portion of the weight of the sensor carriage 32 (for example, a sensor motor), the configuration may be such that the seating projections 24 are disposed directly below the trajectory of the center of gravity of that member.

In addition, according to the configuration of the first embodiment, the seating projections 24 are formed of inverted conical trapezoidal shapes and the seating receiving portions 155 are formed of shapes that are complementary to those of the seating projections 24, and the seating projections 24 fit into the seating receiving portions 155 while being guided thereby when the scanner unit 3 is closed. Accordingly, the scanner unit 3 can be closed in a state in which the scanner unit 3 is positioned relative to the printer unit 2, and positional skew (looseness) in the depth direction and the width direction of the scanner unit 3 can be effectively prevented when the scanner unit 3 is in a closed state.

Furthermore, according to the configuration of the first embodiment, pairs of the seating openings 172, reinforcing support portions 135, and seating projections 24 are provided corresponding to the two upper plate portions 164, and the positions of the upper plate portions 164 in the depth direction and the width direction are regulated through the scanner unit 3 as a result of the pair of seating projections 24 and the pair of seating openings 172 linked thereto operating together. Accordingly, it is possible to suppress problems in which the relative positions of the upper plate portions 164 become further apart from each other or closer to each other due to heat deformation, external forces, or the like.

Meanwhile, according to the configuration of the second embodiment, the ring-shaped projections 212 are provided, and the positions of the seating projections 24 on the upper plate portions 164 are regulated by the ring-shaped projections 212. Accordingly, positional skew (looseness) in the depth direction and the width direction of the scanner unit 3 can be prevented.

Although the configuration is such that a pair of seating projections 24 are provided in parallel in the width direction (the axial direction of the hinge portion 4) in the aforementioned embodiments, it should be noted that the configuration may be such that only one seating projection 24 is provided, or three or more seating projections 24 are provided. In this case, a corresponding number of reinforcing support portions 135, seating openings 172, seating portions 211, and so on are provided as well.

Furthermore, although the reinforcing support portions 135 are configured of parts of the apparatus frame 64 in the aforementioned embodiments, the configuration may be such that reinforcing support portions 135 that are separate entities from the apparatus frame 64 are employed.

Furthermore, although the invention is applied in the complex machine 1 that includes the printer unit 2 and the scanner unit 3 in the aforementioned embodiments, the invention is not limited thereto, and may be applied in any complex apparatus as long as that complex apparatus includes a first device and a second device, such as a complex apparatus including a copy machine and a facsimile device, and so on.

Furthermore, although the configuration is such that the seating projections 24 are formed as parts of the lower case 16 in the aforementioned embodiments, the seating projections 24 may be configured of elastic members (such as elastic rubber members).

The entire disclosure of Japanese Patent Application No: 2010-254591, filed Nov. 15, 2010 is expressly incorporated by reference herein.

What is claimed is:

1. A complex apparatus comprising:
a recording device including a recording unit that executes recording on a medium, the recording device including an upper portion;
an image reading device configured to be freely openable/closable with respect to the upper portion of the recording device via a hinge portion, the image reading device including an image reading unit that reads an image;
a first contact portion configured to make contact with a housing of the recording device when the image reading device is in a closed state, the first contact portion being disposed in the image reading device;
a second contact portion configured to make contact with the first contact portion when the image reading device is in the closed state, the second contact portion being disposed in the housing; and
a third contact portion configured to make contact with the housing of the recording device at a lower area of the second contact portion opposite from an upper area of the second contact portion in contact with the first contact portion when the image reading device is in the closed state, the third contact portion being disposed in the apparatus frame that holds the recording unit, the first contact portion, the second contact portion and the third contact portion being aligned to transfer loads from the image reading device to the apparatus frame.

2. The complex apparatus according to claim 1,
wherein the housing includes two plate portions separated from each other in a width direction of the recording device;
a pair of the second contact portions is provided corresponding to the two plate portions; and
a pair of each of the first contact portions and the third contact portions are provided corresponding to the pair of the second contact portions.

3. The complex apparatus according to claim 1, further comprising:
an information input unit configured to instruct the recording unit to record on the medium; and
a pair of support portions, provided in the apparatus frame, that spans the information input unit and supports the information input unit on the apparatus frame,
wherein a plurality of the third contact portion are provided in areas extended from the support portions.

4. The complex apparatus according to claim 1, wherein the periphery of a plurality of the second contact portions of the housing has shapes that surround a plurality of the first contact portions that make contact therewith.

5. The complex apparatus according to claim 1,
wherein the image reading device includes a sensor for reading an image and a carriage on which the sensor is mounted and that moves; and
when the image reading device is in the closed state, the first contact portion is disposed below a region of movement of the carriage.

6. The complex apparatus according to claim 5, wherein the carriage includes a motor and a housing portion that houses the motor, and when the image reading device is in the closed state, the first contact portion is disposed below the housing portion.

7. A complex apparatus comprising:
a recording device including a recording unit that executes recording on a medium, the recording device including an upper portion;
an image reading device configured to be freely openable/closable with respect to the upper portion of the recording device via a hinge portion, the image reading device including an image reading unit that reads an image;
an apparatus frame that holds the recording unit of the recording device;
a first contact portion configured to make contact with the apparatus frame when the image reading device is in a closed state, the first contact portion being provided in the image reading device;
an opening provided in a housing of the recording device, the opening being configured to receive the first contact portion when the image reading device is in the closed state; and
a second contact portion configured to make contact with the first contact portion, the second contact portion being provided in the apparatus frame, the first contact portion, the opening, and the second contact portion being aligned to transfer loads from the image reading device to the apparatus frame.

8. The complex apparatus according to claim 7,
wherein the housing includes two plate portions separated from each other in a width direction of the recording device;
a pair of the openings is provided corresponding to the two plate portions; and
a pair of each of the first contact portions and the second contact portions are provided corresponding to the pair of openings.

9. The complex apparatus according to claim 7, further comprising:
an information input unit configured to instruct the recording unit to record on the medium; and
a pair of support portions, provided in the apparatus frame, that spans the information input unit and supports the information input unit on the apparatus frame,
wherein a plurality of the second contact portions are provided in areas extended from the support portions.

10. The complex apparatus according to claim 7, wherein the first contact portion and the second contact portion are formed having complementary shapes.

11. The complex apparatus according to claim 7,
wherein the image reading device includes a sensor for reading an image and a carriage on which the sensor is mounted and that moves; and when the image reading device is in the closed state, the first contact portion is disposed below a region of movement of the carriage.

12. The complex apparatus according to claim 11, wherein the carriage includes a motor and a housing portion that houses the motor, and when the image reading device is in the closed state, the first contact portion is disposed below the housing portion.

* * * * *